(12) United States Patent
Thibaut et al.

(10) Patent No.: US 9,859,805 B2
(45) Date of Patent: Jan. 2, 2018

(54) SUBSEA ELECTRICAL ARCHITECTURES

(75) Inventors: Edouard Thibaut, Pau (FR); Henri Baerd, Massy (FR)

(73) Assignee: TOTAL SA, Courbevoie (FR)

( * ) Notice: Subject to any disclaimer, the term of this patent is extended or adjusted under 35 U.S.C. 154(b) by 785 days.

(21) Appl. No.: 14/122,615

(22) PCT Filed: May 31, 2012

(86) PCT No.: PCT/EP2012/060267
§ 371 (c)(1),
(2), (4) Date: Nov. 26, 2013

(87) PCT Pub. No.: WO2012/164029
PCT Pub. Date: Dec. 6, 2012

(65) Prior Publication Data
US 2014/0097678 A1    Apr. 10, 2014

Related U.S. Application Data

(60) Provisional application No. 61/492,280, filed on Jun. 1, 2011, provisional application No. 61/492,285, filed on Jun. 1, 2011.

(51) Int. Cl.
*H02M 5/00* (2006.01)
*H02J 4/00* (2006.01)

(52) U.S. Cl.
CPC ............... *H02M 5/00* (2013.01); *H02J 4/00* (2013.01); *Y10T 307/25* (2015.04)

(58) Field of Classification Search
CPC .. H02J 4/00; H02J 1/10; E21B 33/035; H02B 1/24; H02B 7/00; H05K 5/06; H02M 5/00
See application file for complete search history.

(56) References Cited

U.S. PATENT DOCUMENTS

| | | | |
|---|---|---|---|
| 2004/0102109 A1* | 5/2004 | Cratty | B63H 21/17 440/113 |
| 2009/0146603 A1* | 6/2009 | Sihler | H02M 3/158 318/812 |
| 2010/0139544 A1* | 6/2010 | Bo | B63G 8/08 114/337 |
| 2011/0247825 A1* | 10/2011 | Batho | E21B 41/0007 166/335 |
| 2011/0304289 A1 | 12/2011 | Burdick | |
| 2013/0169044 A1 | 7/2013 | Stinessen et al. | |

FOREIGN PATENT DOCUMENTS

| EP | 2 293 407 | 3/2011 |
|---|---|---|
| WO | WO 01/84689 | 11/2001 |
| WO | WO 2007/055587 | 5/2007 |
| WO | WO 2007/055594 | 5/2007 |
| WO | WO 2008/055515 | 5/2008 |
| WO | WO 2008/110209 | 9/2008 |
| WO | WO 2010/110952 | 9/2010 |

\* cited by examiner

*Primary Examiner* — Jared Fureman
*Assistant Examiner* — Rafael Pacheco
(74) *Attorney, Agent, or Firm* — Patterson Thuente Pedersen, P.A.

(57) ABSTRACT

The subject-matter of the present invention concerns an electrical architecture for power distribution to subsea equipment comprising at least one variable speed drive, VSD, module, wherein said at least one VSD module comprises at least one self commutated line side converter including power semiconductor.

5 Claims, 3 Drawing Sheets

Prior Art

SUBSEA ELECTRICAL ARCHITECTURES

PRIORITY CLAIM

The present application is a National Phase entry of PCT Application No. PCT/EP2012/060267, filed May 31, 2012, which claims priority from U.S. Provisional Patent Application No. 61/492,280, filed Jun. 1, 2011, and U.S. Provisional Patent Application No. 61/492,285, filed Jun. 1, 2011, said applications being hereby incorporated by reference herein in their entirety.

TECHNICAL FIELD

The present invention relates to apparatus for the provision of electrical power for subsea applications, such as compression and pumping applications. More particularly, the present invention proposes new electrical architectures for compression and pumping applications, including the supply of AC from the surface, via a very long subsea cable, to subsea production fields that include subsea processing units with pump and compressor equipment.

BACKGROUND OF THE INVENTION

With today's oil and gas fields fast becoming depleted, and discoveries of easy-to-produce offshore oil and gas resources becoming ever rarer, subsea processing equipment is the focus of an extensive development drive. Subsea processing equipment is an attractive option for remote fields, deep waters and tough topside environments such as Arctic locations, the Gulf of Mexico or the Persian Gulf, since this technology can maximize recovery of offshore resources and help to maintain the production plateau for as long as possible.

As a result, the trend in the offshore oil and gas industry is increasingly moving away from platforms or floating vessels, and towards remote fields developed from the shore. This in turn generates the need to develop highly reliable subsea electrical power transmission, distribution and conversion systems, for deployment over long step-outs and in deep waters.

However, subsea locations present challenges since the electrical equipment will often be out of range of direct human intervention; for example such equipment are often installed on the sea-floor at depths reaching 2,500 or 3,000 meters. Hence, the electrical equipment is dependent on Remote Operated Vehicles (ROV) and intervention vessels for maintenance operations.

Subsea electrical equipment must therefore have a high reliability, and accordingly the equipment is generally designed for an operating life of around twenty years and for maintenance intervals of around five years.

To achieve such high reliability, compact modular designs which have a minimum number of subsea interfaces are generally employed. Such features both enhance the reliability facilitate installation and retrieval without requiring heavy-duty ships and cranes.

Unlike onshore transmission, distribution and conversion systems, which are often based on a ring system that makes faults easy to isolate, subsea transmission, distribution and conversion systems are normally point-to-point connections with a single transmission link. This is true especially for long offshore step-outs, where the use of a ring system would be unfeasible, primarily due to the excessive cost of the electrical cable required. However, the use of a point-to-point connection further increases the need for a system with a high reliability and availability.

The electrical consumption for subsea distribution and their power requirements tend to vary widely. The consumption can include Subsea Control Module (SCM), electrical heating, subsea pumps and subsea compressors, and the combined load may range from a few kW to more than 50 MW. Thus, subsea applications are required to have appropriate electrical transmission and distribution architectures that meet the constraints mentioned above to supply these loads.

AC transmission is the prime choice for electrical power transmission in the subsea industry: it offers the possibility of easily stepping voltage up or down by means of a transformer. It also allows electrical power to be transported at high voltage, thereby reducing losses and achieving more efficient transmission. Subsea electrical transmission by AC is based on proven technologies that are well known, standard and mature. A further advantage is that it enables a faulty subsystem to be easily isolated by means of a circuit breaker without stopping the whole system.

Nevertheless, AC transmission also has a number of drawbacks which limit its subsea use for long step-outs and power-intensive subsea applications. Its disadvantages include high voltage variations between no-load and full-load mode, and risks of resonance and reactive power generation by the subsea cable. AC transmission is typically limited to 120 kilometers for 70 MVA at 50 Hz.

Workaround solutions can be adopted to mitigate or reduce some of these drawbacks and extend the application of AC subsea transmission lines to long step-outs. One is to use a frequency of 16⅔ Hz in an architecture typically limited to 200 kilometers for 70 MVA.

Subsea power distribution is often accomplished using components including switchgear to enable power on/power off functionality to be supplied to the load or loads, and also for the provision of isolation or protection functionality.

Subsea power conversion is generally achieved by using auxiliary power supplies and by the use of Variable Speed Drives (VSD).

For a development including subsea compression and pumping, a dedicated VSD powering the compressor and the pump will be located either topside or subsea, depending on the tie-back distance. A topside VSD benefits from the convenience that it greatly reduces the amount of equipment needing to be installed subsea.

However, with such an installation, the maximum cable length is limited, for technical reasons: for instance, for the control of a motor through a long cable.

Thus, a topside VSD can only be used for small stations close to the shore, and an approximate tie-back distance limit is 125 kilometers for a 2.7 MW subsea pump and 60 kilometers for a 10 MW subsea compressor. For longer step-outs, the VSD has to be placed subsea.

FIG. 1 illustrates a classical electrical architecture for subsea compression and pumping applications known in the art. As illustrated, such architecture is based on the use of the following electrical equipment:

A topside step-up transformer 10 that can, optionally, be associated with a Static var Compensator (SVC) to absorb the reactive power generated by the electrical subsea cable. The topside step-up transformer 10 receives electrical power from an external source (not illustrated), which can, for example, be an on-shore electrical generator. The topside step-up transformer 10 is electrically connected to an umbilical 11, which includes the electrical subsea cable. The umbilical 11 conveys electrical power from the topside step-up transformer 10 from above sea-level 9 to a step down transmission transformer 12 that is located below sea-level 9. The step-down transformer 12 receives power from the umbilical 11 and converts the supplied voltage to a suitable voltage for distribution to subsea electrical equipment. The step-down transformer 12 is pressure-compensated and feeds electrical power to a circuit breaker module 13 through wet-mate or dry-mate interfaces.

The circuit-breaker module 13 distributes the electrical power to a subsea load 15 via a subsea VSD module 14 and a subsea transformer 16. One circuit breaker is present for each load 15. Each circuit breaker protects the circuit downstream in the event of a defect and can includes a pre-charge circuit to carry out a pre-charge on the VSD DC bus and the VSD transformers 16 so as to reduce the in-rush current.

The subsea VSD module 14 using a passive Diode Front End rectifier 17 (DFE). The VSD module 14 houses the power electronics for the variable speed function. Connections between the VSD module 14 and the load 15 are via dry and wet mate interfaces. The transformer 16 of the VSD module 14 supplies power at the required level (voltage and phase shift with multi-winding transformers) to the conventional variable frequency drives with the DFE rectifier. In the illustrated example, the load 15 is a subsea compressor and a pump. Not illustrated in FIG. 1, such architecture can also comprise:

A Low Voltage (LV) auxiliary power supply and possibly an uninterruptable power supply (UPS). A wet-mate interface interconnection between the circuit-breaker module, VSD transformers, LV auxiliary and the UPS.

The above described electrical architecture presents many drawbacks, and is not totally suitable for subsea applications.

For example, many of the different components are not easily accessible to humans (as they would be in air) and also some of the electrical equipment will be subject to high ambient pressure conditions.

The subsea use of a 'classical' VSD with a DFE rectifier can also result in harmonic injection into the upstream electrical grid. These harmonics can in turn cause an excessive temperature rise, instabilities, over-voltage and vibrations in electrical equipment. To mitigate these effects, harmonic filtering can be used. However, the implementation of such filtering will tend to result in an increase in the volume and/or weight of the subsea vessels used for the equipment.

The multi-winding transformer configuration also imposes the use of multiple connections between the VSD and its transformer. This is problematic for subsea applications since the reliability is generally highly dependent on the number of electrical connections. Furthermore, due to the use of a DFE rectifier, any subsea bus-bar voltage variations has a direct impact on the subsea VSD DC bus voltage, and therefore on the voltage available to drive the motor, and on the voltage of the transmission and distribution components.

The use of separate circuit breaker modules increases the number of subsea vessels, and also the number of penetrators and connectors.

Further, the use of separate VSD transformer modules, which are mostly required for multiple pulse rectifiers, also increases the number of subsea vessels, and also the number of penetrators and connectors.

Thus, the electrical architecture described above is not well suited for subsea applications, and it is an aim of the present invention to eliminate or mitigate at least some of the above described problems.

SUMMARY OF THE INVENTION

In a first aspect, the present invention provides an electrical architecture for power distribution to subsea equipment such as compressors and/or pumps.

According to the first aspect, the electrical architecture comprises at least one variable speed drive module that comprises at least one self commutated line side converter.

The at least one self-commutated line side converter is a converter in which at least one semiconductor uses self-commutation. The purpose of the self commutated line side converter is to rectify from AC to DC.

Preferably, the at least one self commutated line side converter is an Active Front End (AFE) rectifier architecture. Preferably, it comprises at least six power semiconductors.

By eliminating the subsea VSD diode rectifier and its associated subsea transformer, and by replacing it with an AFE rectifier architecture, the number of connectors/penetrators and the number of subsea modules can both be reduced.

In embodiments, the self commutated line side converter employs power semiconductors, which are directly connected to the bus bar through a circuit breaker. Thus, this specific arrangement reduces the number of subsea modules and associated connections.

In embodiments, the self commutated line side converter comprises at least six power semiconductors such as transistors or thyristors.

Thus, advantageously, this architecture allows absorption of the reactive power resulting from the use of a long upstream electrical cable. The capability of controlling the voltage level at a subsea point of connection can be achieved.

As a result there are fewer disturbances on the driven loads, since the VSD DC bus voltage can be maintained at a constant value and not subject to voltage variation from the upstream power supply. The permanent control of the power factor also permits to optimize the transmission line (electrical cable). It allows reducing the size, weight and the cost of the electrical cable since a part of the cable charging current is consumed now subsea by the AFE rectifier.

In embodiments, each self commutated line side converter comprises at least one transistor rectifier. Advantageously, power semiconductors are insulated gate bipolar transistor, also called IGBT.

In alternative embodiments, each self commutated line side converter comprises at least one thyristor rectifier. Advantageously, power semiconductors are integrated gate controlled thyristor, also called IGCT.

Advantageously, each self commutated line side converter has a rated voltage that is equal or greater than 230 V, preferably greater than 3 kV.

Advantageously, the at least one variable speed drives module can comprise a pre-charge circuit to reduce the in-rush current, and charge the DC bus of the VSD module.

In embodiments, the electrical architecture can comprise a bus bar and a transformer.

Preferably, in such embodiments, each self commutated line side converter is directly connected to the bus bar through a circuit breaker, and without any subsea transformer between the transformer and the VSD module.

Preferably, the at least one variable speed drives module comprises at least one built-in circuit breaker, and without any subsea transformer between the transformer and the VSD module.

DETAILED DESCRIPTION OF THE DRAWINGS

Figure 1:
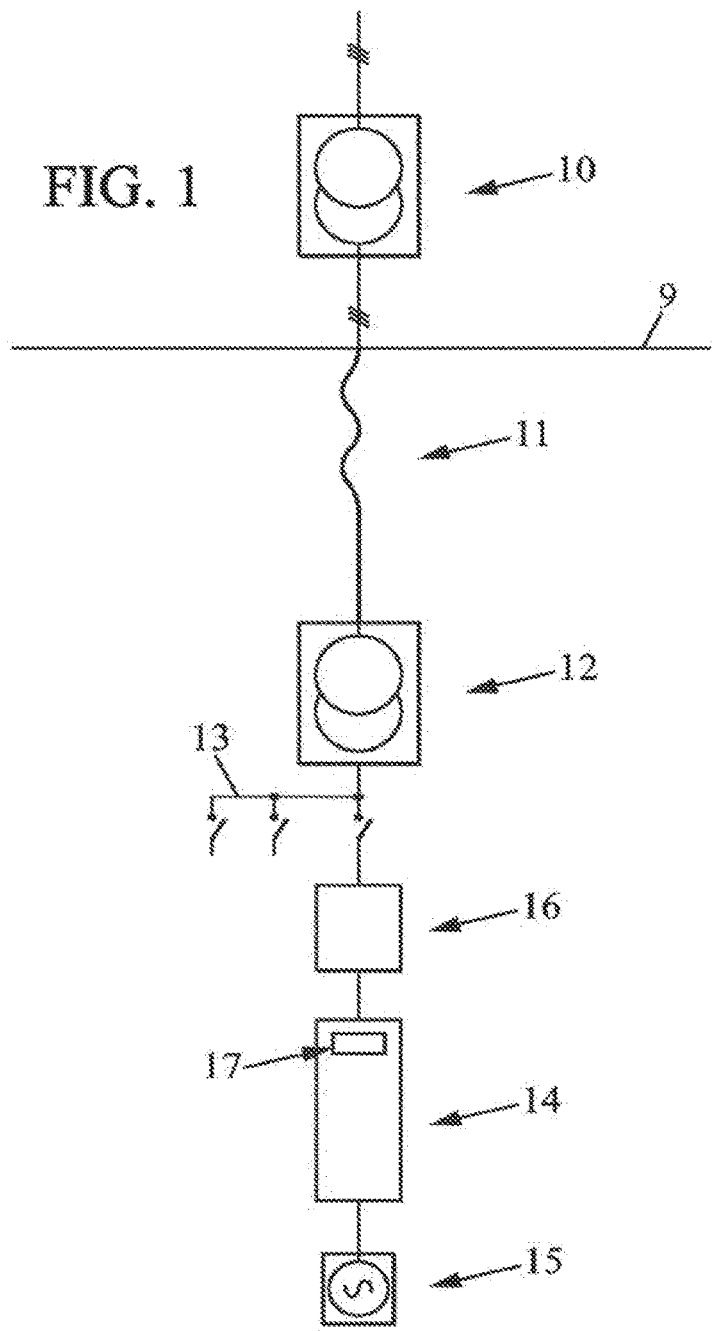
FIG. 1 illustrates an electrical power distribution architecture known in the art.
Figure 2:
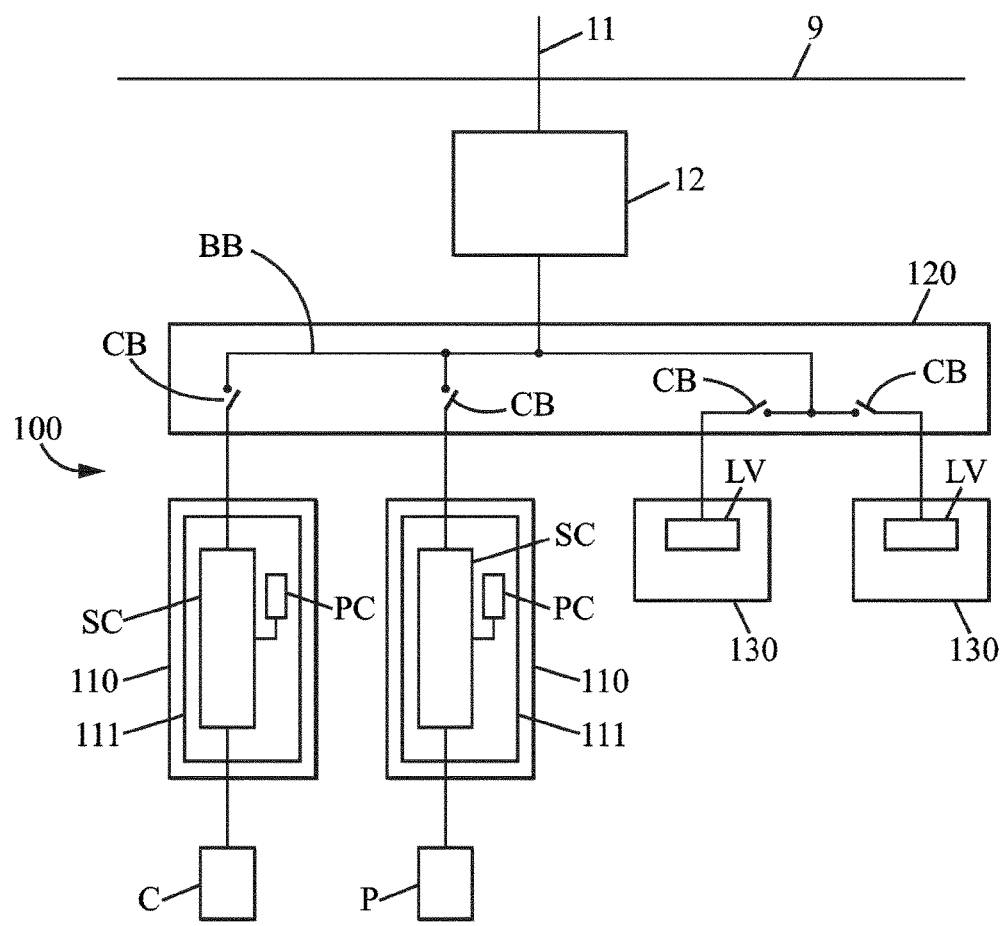
FIG. 2 illustrates an electrical architecture according to an embodiment of the present invention.
Figure 3:
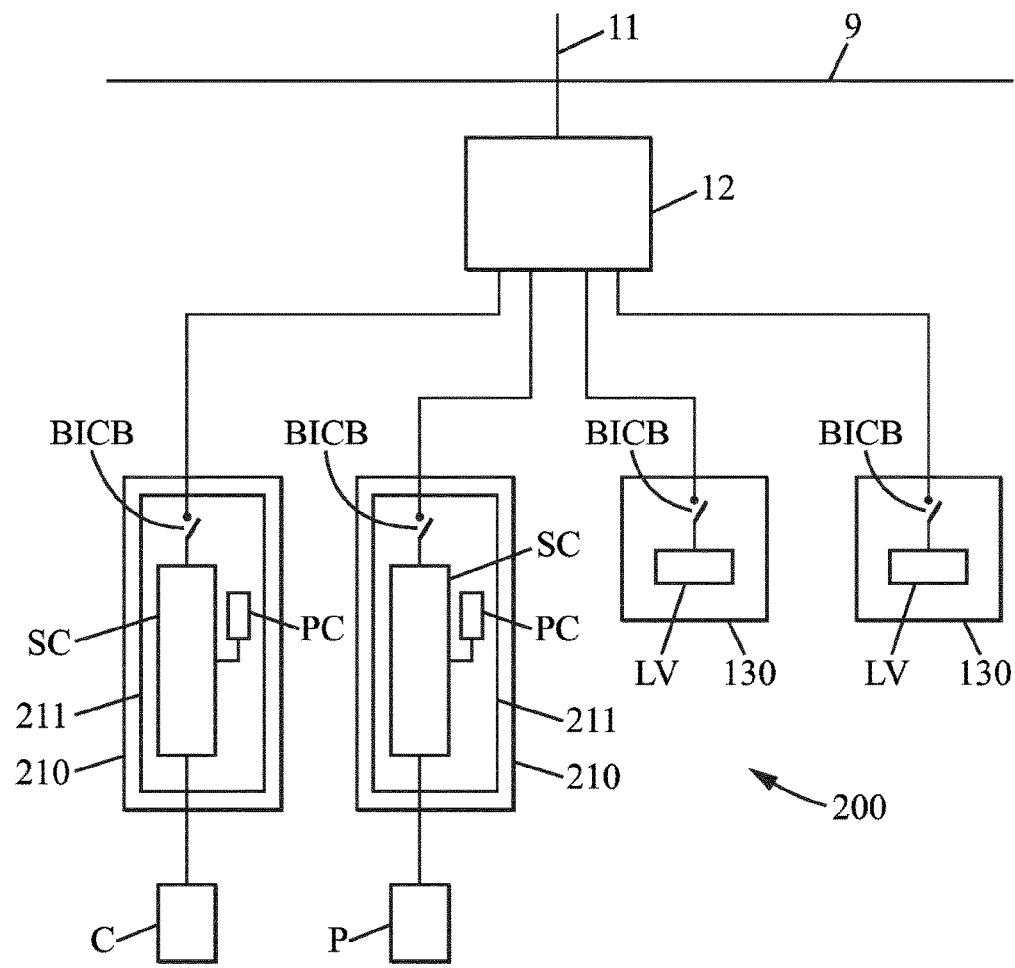
FIG. 3 illustrates an electrical architecture according to another embodiment of the present invention.

Two preferred embodiments are described hereafter in details referring to the annexed FIGS. 2 to 3.

The present invention aims at providing AC or DC electrical power for subsea applications. Hence, the present invention proposes new electrical architectures 100 and 200 for compression and pumping applications, including the supply of AC from the surface, via a very long subsea cable, to subsea production fields that include subsea processing units with pump and compressor equipment.

FIG. 2 illustrates an electrical architecture 100 according to a first embodiment of the present invention. The electrical architecture 100 is configured to supply power to subsea equipment, and as illustrated in figure the equipment is a compressor C and a pump P. The skilled person will recognize that these are merely examples of subsea electrical equipment for which the present invention can be configured to supply electrical power, and should not be construed as limiting. Moreover, whilst two pieces of subsea equipment are illustrated, the skilled person will recognize that the present invention can equally be configured to supply electrical power to a larger or smaller number of pieces of equipment.

As illustrated in FIG. 2, electrical power is received from a remote source located above the sea surface (topside) via an umbilical 11. This umbilical 11 can be an electrical cable for subsea electrical supply known from the art. Electrical power from the umbilical 11 is fed to a transformer 12.

Electrical power from the transformer 12 is fed to a bus bar BB for ultimate distribution to the loads C, P. The bus bar BB comprises electrical conductors which are connected to each load C, P via a circuit breaker CB. Thus, electrical power can be transferred from the transformer 12 to each of the loads C, P if the respective circuit breaker CB is in the closed position. If a circuit breaker CB is in the open position, then the respective load is electrically isolated from the source of electrical power.

Also connected to the bus bar BB are two LV auxiliaries. Each LV auxiliary is connected to the bus bar BB via a circuit breaker. Thus, if power is required from a LV auxiliary, the respective circuit breaker can be closed to thereby transfer electrical power to the bus bar BB. The skilled person will recognize that the LV auxiliaries are not essential to the functioning of the described embodiment. Moreover, whilst two LV auxiliaries are illustrated, the architecture can equally function with a larger or smaller number of LV auxiliaries. The LV auxiliaries are connected to the bus bar BB using a transformer.

Each LV auxiliary is housed within a water resistant housing 130.

The bus bar BB is also housed within a water resistant housing 120 which can either be pressure compensated or not pressure compensated.

Power from the bus bar BB is fed to each load C, P via a VSD module 110.

As illustrated in FIG. 2, each VSD module 110 includes a pre-charge circuit PC. The skilled person will recognize the function and composition of this circuit, and so a complete description will be omitted here. It is sufficient to note that the circuit employed in this manner can act to reduce the in-rush current.

The housing for the VSD modules can either be pressure compensated or not pressure compensated.

The active self commutated line side converter located in 111 includes a plurality of power semiconductors SC.

Thus, by adopting the architecture as described above, the number of connectors/penetrators and the number of subsea module are reduced in comparison to architectures known from the prior art. This is achieved since the VSD transformer has been eliminated by using the Active Front End (AFE) rectifier architecture. In general, the reliability of the system is improved by reducing the number of subsea modules and connectors/penetrators.

By using an active Front End VSD it is also possible to absorb the reactive power that results from use of a long upstream electrical cable. Accordingly, the voltage level at the subsea point of connection can also be controlled. As a result of this, the embodiment provides an architecture wherein fewer disturbances will be present on the driven loads, since the VSD DC bus voltage can now be maintained at a constant voltage, rather than being subject to voltage variation from the upstream power supply.

The permanent control of the power factor also provides a means to optimize the transmission line (electrical cable). It further allows reducing the size, weight and the cost of the electrical cable since a part of the cable charging current is consumed now subsea by the AFE rectifier.

In contrast, for architectures known from the prior art the whole cable charging current travels along the cable to be consumed onshore. Thus, prior art architectures require comparatively greater current, which necessitates an increased size, weight and the cost of the electrical cable in comparison to the presently described architecture.

The presently described architecture also permits a simplification to the circuit breaker module CB, which does not need to include a pre-charge system as this is now part of the VSD module. Accordingly, by employing an AFE rectifier, harmonic current pollution by the subsea VSD is also reduced compared to a VSD with a DFE rectifier.

FIG. 3 illustrates a second embodiment of the present invention in which is illustrated an alternative electrical architecture 200 for power distribution to subsea equipment such like a compressor C or a pump P.

As illustrated in FIG. 3, electrical power is received from a remote source located above the sea surface (topside) via an umbilical 11. This umbilical 11 can be an electrical cable for subsea electrical supply known from the art. Electrical power from the umbilical 11 is fed to a transformer 12.

Electrical power from the transformer 12 is fed to the loads C, P via a VSD module 210. Each load C, P has a dedicated VSD module 210. The VSD modules 210 are of similar construction to those described above in relation to FIG. 2. However, the VSD modules 210 use in this embodiment additionally comprise a circuit breaker BICB.

Thus, electrical power can be transferred from the transformer 12 to each of the loads C, P if the respective circuit breaker CB is in the closed position. If a circuit breaker CB is in the open position, then the respective load is electrically isolated from the source of electrical power.

Also connected to the transformer 12 are LV auxiliaries. The LV auxiliaries are of similar construction to those described above in relation to FIG. 2. However, each of them additionally comprises a circuit breaker BICB. Thus, if power is required from an LV auxiliary, the respective circuit breaker BICB can be closed to thereby transfer electrical power to the transformer 12 As noted above in relation to FIG. 2, the skilled person will recognize that the LV auxiliaries are not essential to the functioning of the described embodiment. Moreover, whilst two LV auxiliaries are illustrated, the architecture can equally function with a larger or smaller number of LV auxiliaries.

Each LV auxiliary is housed within a water resistant housing 130 as discussed above in relation to FIG. 2.

As discussed above in relation to FIG. 2, the VSD module 210 includes a pre-charge circuit PC. The nature and function of this circuit is essentially the same as noted above in relation to FIG. 2. Again, the VSD modules are housed in water resistant housings.

Since the architecture of the second embodiment eliminates the need for the bus bar BB, the architecture is further simplified form that disclosed in the first embodiment. Since there are fewer subsea modules in this second embodiment in comparison to the first embodiment, the reliability of the system will be generally enhanced.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above. In particular, the embodiments describe above could be combined.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

It is stipulated that the reference signs in the claims do not limit the scope of the claims, but are merely inserted to enhance the legibility of the claims.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A subsea installation for electrical power distribution to subsea equipment, the subsea installation comprising:
a transformer, receiving AC from the surface,
a plurality of variable speed drive (VSD) modules, wherein each VSD module comprises at least one active front end (AFE) rectifier comprising at least one semiconductor to rectify AC to DC, and
a bus bar, distributing transformed AC from the transformer to the plurality of VSD modules,
wherein each AFE rectifier has a rated voltage greater than 3 kV, and is directly connected to the bus bar through a circuit breaker and without a VSD transformer between the transformer and the VSD module.

2. The subsea installation of claim 1, wherein each AFE rectifier includes at least six power semiconductors.

3. The subsea installation of claim 1, wherein each power semiconductor is a transistor or thyristor.

4. The subsea installation of claim 1, wherein the at least one VSD module further comprises a pre-charge circuit to reduce the in-rush current.

5. The subsea installation of claim 1, further comprising a transformer, wherein the at least one VSD module further comprises at least one built-in circuit breaker and without any subsea transformer between the transformer and the VSD module.

* * * * *